(12) United States Patent
Oren et al.

(10) Patent No.: US 8,705,648 B2
(45) Date of Patent: Apr. 22, 2014

(54) DIVERSITY SCHEMES FOR 2-D ENCODED DATA

(75) Inventors: Roy Oren, Magshimim (IL); Tomer Yablonka, Tel-Aviv (IL)

(73) Assignee: Siano Mobile Silicon Ltd., Kfar Netter (IL)

( * ) Notice: Subject to any disclaimer, the term of this patent is extended or adjusted under 35 U.S.C. 154(b) by 295 days.

(21) Appl. No.: 13/244,485

(22) Filed: Sep. 25, 2011

(65) Prior Publication Data

US 2013/0077719 A1 Mar. 28, 2013

(51) Int. Cl.
*H04B 7/02* (2006.01)
(52) U.S. Cl.
USPC .......................................... 375/267; 375/347
(58) Field of Classification Search
CPC ................................ H04B 7/0882; H04L 1/06
USPC .................................................. 375/267, 347
See application file for complete search history.

(56) References Cited

U.S. PATENT DOCUMENTS

| | | | | |
|---|---|---|---|---|
| 2004/0008757 A1* | 1/2004 | Ulupinar et al. | ............... | 375/148 |
| 2004/0261007 A1* | 12/2004 | Heppe | ........................... | 714/821 |
| 2006/0227734 A1* | 10/2006 | Tu et al. | ........................ | 370/311 |
| 2009/0222712 A1* | 9/2009 | Zhong et al. | ................... | 714/793 |
| 2009/0274205 A1* | 11/2009 | Jao et al. | ........................ | 375/230 |
| 2010/0062737 A1 | 3/2010 | Zhong et al. | | |
| 2010/0304744 A1* | 12/2010 | Hu et al. | ........................ | 455/434 |

OTHER PUBLICATIONS

ETSI Technical report TR 102 377, "Digital Video Broadcasting (DVB); DVB-H Implementation Guidelines," version 1.4.1, Jun. 2009.
GY/T 220.1-2006, "Standard for Radio Film and Television Industry in P.R. China—Mobile Multimedia Broadcasting Part 1: Framing Structure, Channel Coding and Modulation for Broadcasting Channel," Oct. 24, 2006.
Advanced Television Systems Committee Inc., "ATSC—Mobile DTV Standard, Part 2—RF/Transmission System Characteristics", document A/153, Oct. 15, 2009.

\* cited by examiner

*Primary Examiner* — Juan A Torres
(74) *Attorney, Agent, or Firm* — D. Kligler IP Services Ltd.

(57) ABSTRACT

A method for communication includes receiving a signal carrying data including multiple data units using at least first and second reception channels. The data units are encoded with first and second codes such that, when the data units are arranged in rows and columns, the rows are encoded with the first code and the columns are encoded with the second code. The data units received by the first and second reception channels are selectively combined to produce composite data, which includes at least one row or column that includes a first data unit received from the first reception channel and at least a second data unit received from the second reception channel. The first and second codes for the composite data are decoded, including the at least one row or column, so as to reconstruct the data.

12 Claims, 2 Drawing Sheets

DIVERSITY SCHEMES FOR 2-D ENCODED DATA

FIELD OF THE INVENTION

The present invention relates generally to communication systems, and particularly to methods and systems for diversity reception.

BACKGROUND OF THE INVENTION

Some communication receivers use diversity techniques in order to improve reception performance. For example, U.S. Patent Application Publication 2010/0062737, whose disclosure is incorporated herein by reference, describes a receiver that comprises a plurality of paths for receiving wireless signals. Each path has a designated antenna. An antenna diversity chain is adapted for information communication between the plurality of paths for selecting and using a path among the plurality of paths.

SUMMARY OF THE INVENTION

An embodiment of the present invention that is described herein includes a method for communication. The method includes receiving a signal carrying data including multiple data units using at least first and second reception channels. The data units are encoded with first and second codes such that, when the data units are arranged in rows and columns, the rows are encoded with the first code and the columns are encoded with the second code. The data units received by the first and second reception channels are selectively combined to produce composite data, which includes at least one row or column that includes a first data unit received from the first reception channel and at least a second data unit received from the second reception channel. The first and second codes for the composite data are decoded, including the at least one row or column, so as to reconstruct the data.

In some embodiments, the data units include bits, bytes, words and/or symbols. In an embodiment, receiving the signal includes decoding the first or second code for at least some of the rows or columns of the data received by the first and second reception channels, and selectively combining the data units includes identifying one or more rows or columns whose decoding is successful in at least one of the first and second reception channels, and adding one or more of the data units of the identified rows or columns to the composite data. In an embodiment, selectively combining the data units includes identifying at least one row or column whose decoding has failed in all the reception channels, and marking the data units of the identified row or column in the composite data as erasures, and decoding the first and second codes includes decoding at least one of the codes based on the erasures.

In another embodiment, decoding the first and second codes includes applying an iterative decoding process that alternates between decoding of the first code and decoding of the second code. In yet another embodiment, each of the first and second codes includes one of an Error Correction Code (ECC) and an Error Detection Code (EDC).

There is additionally provided, in accordance with an embodiment of the present invention, a communication apparatus including at least first and second reception channels and circuitry. Each of the reception channels is configured to receive a signal that carries data including multiple data units. The data units are encoded with first and second codes such that, when the data units are arranged in rows and columns, the rows are encoded with the first code and the columns are encoded with the second code. The circuitry is configured to selectively combine the data units received by the first and second reception channels to produce composite data, which includes one row or column that includes a first data unit received from the first reception channel and at least a second data unit received from the second reception channel, and to decode the first and second codes for the composite data, including the at least one row or column, so as to reconstruct the data.

The present invention will be more fully understood from the following detailed description of the embodiments thereof, taken together with the drawings in which:

DETAILED DESCRIPTION OF EMBODIMENTS

Overview

Figure 1:
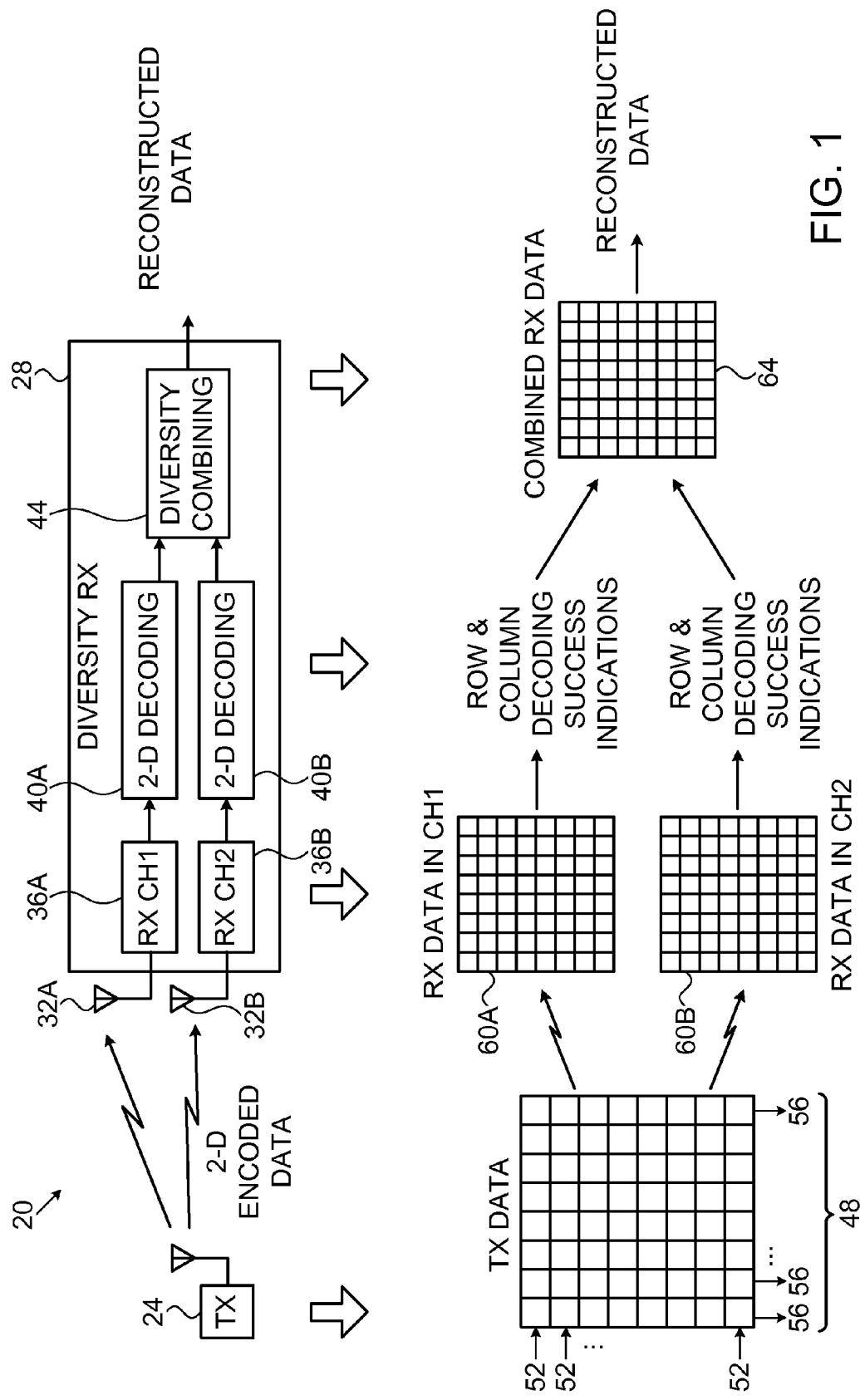
FIG. 1 is a block diagram that schematically illustrates a wireless communication system and associated data structures, in accordance with an embodiment of the present invention.

Some communication systems encode data for transmission in two dimensions. In a typical 2-D encoding scheme, a transmitter arranges the data in a table, encodes the rows of the table with a first code, encodes the columns of the table with a second code, and transmits the encoded data to a receiver. Each of the codes may comprise an Error Correction Code (ECC) or Error Detection Code (EDC). The receiver decodes the codes that encode the rows and columns in order to reconstruct the data.

Encoding schemes of this sort are used, for example, in Mobile Digital Television (MDTV) transmission standards such as the Digital Video Broadcasting-Handheld (DVB-H) standard, the China Multimedia Mobile Broadcasting (CMMB) standard and the Advanced Television Systems Committee (ATSC) standards. Two-dimensional encoding in DVB-H is specified in ETSI Technical report TR 102 377, entitled "Digital Video Broadcasting (DVB); DVB-H Implementation Guidelines," version 1.4.1, June, 2009, which is incorporated herein by reference. CMMB 2-D encoding is specified in standard GY/T 220.1-2006, entitled "Standard for Radio Film and Television Industry in P.R. China—Mobile Multimedia Broadcasting Part 1: Framing Structure, Channel Coding and Modulation for Broadcasting Channel," Oct. 24, 2006, which is incorporated herein by reference. Two-dimensional encoding in ATSC specifications is described, for example, in "ATSC-Mobile DTV Standard, Part 2—RF/Transmission System Characteristics," document A/153, October, 2009, which is incorporated herein by reference.

Embodiments of the present invention that are described herein provide improved methods and systems for receiving and decoding signals that carry 2-D encoded data. In the disclosed embodiments, a diversity receiver comprises multiple reception channels. Each reception channel receives a respective replica of the 2-D signal via a respective antenna. Thus, each reception channel produces a respective 2-D data table comprising the data received by that channel. The 2-D data tables of the different reception channels are made-up of multiple data units, which may comprise, for example, bits, bytes, words or symbols.

The receiver constructs a composite data table from the multiple data tables received over the multiple reception channels, by selectively combining the data units of the different data tables. The composite data table typically includes at least one hybrid row or column, which comprises one or more data units originating from the data table of one reception channel, and one or more data units originating from the data table of a different reception channel. The receiver then decodes the rows and columns of the composite data table, including the hybrid row or column, so as to reconstruct the data.

The receiver may use various methods and criteria for constructing the composite data table from the data tables produced by the multiple reception channels. In some embodiments, the receiver decodes the first and second codes for at least some of the rows and columns of the data tables received from the various reception channels. For each decoded row or column in a certain data table, the receiver produces a respective success indication that indicates whether this row or column was decoded successfully. The receiver uses the success indications to select which data units, and from which data tables, to include in the composite data table.

In constructing the composite data table, the receiver typically attempts to maximize the number of successfully-decoded rows and columns. In some embodiments, the receiver selects data units from rows and columns that were decoded successfully by the reception channels and substitutes them into the composite data table. In some embodiments, the process of constructing the composite data table is iterative and/or involves additional decoding operations.

In one example embodiment, the receiver initially populates the composite data table with the columns that were decoded successfully in at least one of the reception channels. Then, the receiver decodes the rows of the composite table. This row decoding process will typically perform far better than the row decoding process in each reception channel, since it is based on a higher number of data units that are already known to be correct. In alternative embodiments, any other suitable process can be used. Several additional examples are described below.

The methods and systems described herein reconstruct the 2-D encoded data with high reliability. As explained above, the composite data table comprises data units from successfully-decoded rows and columns that are selected on an individual basis from the different data tables. Therefore, the disclosed techniques are able to decode the first and second codes with considerably better performance, relative to a naive diversity process that simply selects the entire data table from the best-performing reception channel.

System Description

FIG. 1 is a block diagram that schematically illustrates a wireless communication system 20 and associated data structures, in accordance with an embodiment of the present invention. System 20 comprises a transmitter (TX) 24, which transmits signals to a diversity receiver 28. System 20 may operate in accordance with various communication protocols and may be used for various applications. In the present example, system 20 is used for transmitting MDTV signals to mobile communication terminals. Although the example of FIG. 1 shows a single transmitter and a single receiver for the sake of clarity, real-life systems typically comprise multiple transmitters and receivers.

The signals transmitted by transmitter 24 carry data that has been encoded in two dimensions. Typically, the transmitter arranges a block of data for transmission in a table 48 having rows 52 and columns 56. Each table entry is referred to herein as a data unit, and may comprise, for example, a bit, a byte, a word, a symbol or any other suitable data unit. The transmitter encodes the rows with a first code, and the columns with a second code. The 2-D encoded data is them modulated onto a Radio Frequency (RF) signal and transmitted over a wireless channel to receiver 28.

Transmitter 24 may use any suitable types of codes to encode the rows and columns of the data. Each of the codes may comprise an Error Correction Code (ECC) such as a Low Density Parity check (LDPC) of Reed-Solomon (RS) code, an Error Detection Code (EDC) such as Cyclic Redundancy Check (CRC), or any other suitable code. The codes used for encoding the rows and columns may comprise different codes or the same code. Encoding of the columns may be performed either before or after encoding of the columns. In other words, redundancy bits of one code may be encoded with the other code.

Note that the terms "rows are encoded with a first code" and "columns are encoded with a second code" are also meant to cover implementations in which groups of two or more rows (or groups of two or more columns) are each encoded jointly to form code words. In CMMB systems, for example, groups of columns may be encoded to form respective LDPC code words.

Diversity receiver 28 comprises multiple receive antennas that are coupled to multiple respective reception (RX) channels. The example of FIG. 1 shows two receive antennas 32A and 32B, and two reception channels 36A and 36B. Alternatively, any suitable number of reception channels can be used. Each reception channel receives the signal from transmitter 24 over a different wireless channel, and therefore the received signals typically differ from one another.

Diversity receiver 28 uses the multiple signals received by the multiple reception channels to reconstruct the transmitted data with high reliability, using methods that are described in detail below. The disclosed techniques are particularly useful in fading channels, such as, for example, non-line-of-sight and multipath channels.

Each reception channel receives the RF signal via its respective antenna, down-converts the signal to baseband, demodulates the signal and applies other functions such as filtering and gain control. Each reception channel typically reconstructs a data table having rows and columns comprising the data units received by that reception channel. In the present example, reception channels 36A and 36B produce data tables 60A and 60B, respectively. The rows and columns of tables 60A and 60B correspond to the rows and columns of table 48 transmitted by transmitter 24. Some of the data units in tables 60A and 60B, however, may be erroneous due to reception errors.

In the present example, reception channels 36A and 36B are coupled to respective 2-D decoding units 40A and 40B. Each 2-D decoding unit decodes the first and second codes that encode the rows and columns of the data table produced by the respective reception channel. For each decoded row or column, the 2-D decoding unit produces a success indication that indicates whether the row or column was decoded successfully. The success indications of the rows and columns of the data tables of the different reception channels are provided to a diversity combining unit 44.

Diversity combining unit 44 constructs a composite data table 64 from the multiple data tables produced by the multiple reception channels. Typically, unit 44 selects individual data units from the rows and columns of the various data tables and populates the composite data table with the selected data units. Typically, the composite data table includes at least one row or column, which comprises one or more data units selected from the data table of one reception channel, and one or more data units selected from the data table of a different reception channel. In some embodiments, unit 44 selects the data units for the composite data table based on the success indications, i.e., selects data units from rows and columns whose decoding is known to be successful.

After populating composite data table 64, unit 44 decodes the first and second codes for the respective rows and columns of the composite data table, so as to reconstruct the transmitted data. The reconstructed data is provided as output of receiver 28.

Since the composite data table is populated with data units selected from rows and columns that were decoded successfully, i.e., data units that are known to be correct with very high likelihood, data reconstruction is highly reliable. Moreover, the composite data table comprises successfully-decoded data units that are selected on an individual basis from the different data tables. As such, decoding of the first and second codes for the composite data table is far more reliable than decoding of any individual data table.

Combining unit 44 may use various methods and criteria for constructing the composite data table from the multiple data tables produced by the multiple reception channels. Several example methods are described further below.

The configuration of receiver 28 shown in FIG. 1 is an example configuration, which is chosen purely for the sake of conceptual clarity. In alternative embodiments, any other suitable receiver configuration can be used. For example, generation of the row and column success indications may be performed in a single unit that handles the data tables of all reception channels, rather than by multiple 2-D decoding units as in FIG. 1. For example, the functions of 2-D units 40A and 40B and of combining unit 44 may be implemented in a single unit.

The various elements of receiver 28 can be implemented using hardware, such as using one or more RF Integrated Circuits (RFIC), Application-Specific Integrated Circuits (ASIC) or Field-Programmable Gate Arrays (FPGA). Alternatively, certain receiver elements can be implemented in software, or using a combination of hardware and software elements.

Generally, the receiver elements that decode the first and second codes to generate the success indications, and construct and decode the composite data table, are referred to herein collectively as circuitry that carries out the techniques described herein. The circuitry may comprise hardware elements, software elements, or both. In some embodiments, certain elements of receiver 28 may be implemented in a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

EXAMPLE 2-D DIVERSITY RECEPTION SCHEMES

In some embodiments, diversity combining unit 44 selects individual data units from successfully-decoded rows and columns of data tables 60A and 60B, and populates composite data table 64 with the selected data units. Unit 44 then decodes the first and second codes for the rows and columns of the composite data table.

In an example embodiment, unit 44 scans the rows of data table 60A. Upon detecting a row whose success indication indicates that the first code for that row was decoded successfully, unit 44 copies the row to the corresponding row in composite data table 64. Upon detecting a row whose success indication indicates that decoding of the first code failed, unit 44 reverts to the corresponding row in data table 60B. If the row in question in table 60B was decoded successfully, unit 44 copies the row from table 60B to composite table 64. Otherwise, the corresponding row in composite table 64 is marked as errors or erasures.

In an alternative embodiment, unit 44 may scan the columns of data tables 60A and 60B in a similar manner, either in addition to or instead of scanning the rows. Generally, unit 44 need not necessarily scan every row and every column in the data table of every reception channel. In some embodiments, unit 44 may scan only some of the rows and/or some of the columns.

In some embodiments, receiver 28 decodes the first and/or the second code in a decoding process that uses erasures. In such a decoding process, indicating a given data unit as an erasure increases the error correction capability of the decoding process. In these embodiments, when a given row or column is not decoded successfully in any of the reception channels, the data units of this row or column can be marked in the composite data table as erasures.

Note that a certain data unit may belong to a row that failed to decode in all reception channels, but also belong to a column that was decoded successfully in one or more of the reception channels. In this case, the corresponding data unit in the composite data table will typically be populated with the value that was decoded successfully in column decoding. Similar logic can be applied to a data unit belonging to a column that were not decoded successfully in any of the channels.

In some embodiments, combining unit 44 constructs composite data table 64 in an iterative process that involves additional decoding operations of the first and/or second code. Consider, for example, a transmission scheme in which the table columns are encoded with CRC and the table rows are encoded with a Reed-Solomon (RS) ECC. In an example embodiment, unit 44 initially identifies the columns that have valid CRC in at least one of the reception channels, and populate the composite data table with the data units of these columns. The remaining columns (whose CRC has failed in all reception channels) are marked as erasures. Then, unit 44 decodes the RS code for the rows of the composite table using the populated data and erasures.

In another example embodiment, unit 44 may decode the rows and columns of the composite table iteratively, in an alternating manner. In such a process, additional errors are corrected in each iteration, such that each iteration improves the performance of the next. Referring to the above CRC/RS example, unit 44 initially populates the composite data table with the columns whose CRC was valid in at least one of the reception channels. The remaining columns are marked as erasures. Then, unit 44 decodes the RS code for the rows of the composite table. This row decoding operation changes some of the erasures to successfully-decoded data unit values, i.e., replaces some of the erasures with correct data values. The successfully-corrected data units may cause the CRC of some columns to become valid, which enables unmarking the erasures in those columns, which may in turn enable additional rows to be decoded successfully in the next iteration. This iterative process may continue until meeting some termination criterion.

As another example, consider an implementation in which the rows are encoded with CRC. In an embodiment, unit 44 identifies rows that failed CRC decoding in one reception channel, replaces erased data units in these rows with corresponding data units from another reception channel, and re-attempts to decode the CRC. In other words, unit 44 attempts to find a mix of data units from different reception channel that enables successful decoding of the CRC. For example, if a given row that still fails CRC decoding comprises ten erasures, unit 44 may populate these erasures with the odd-order data units from one reception channel and the even-order data units from the other reception channel. Alternatively, any other mixture can be attempted.

Further alternatively, combining unit 44 may carry out any other suitable process of populating and decoding the rows and columns of composite data table 64 based on the data tables produced by the multiple reception channels.

Figure 2:
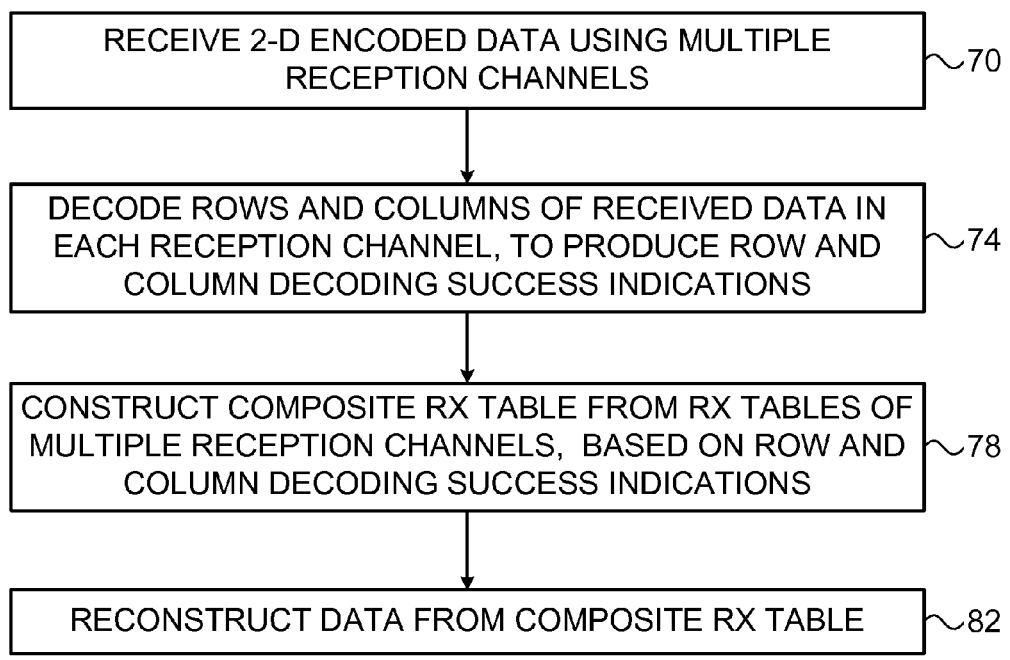
FIG. 2 is a flow chart that schematically illustrates a method for diversity reception, in accordance with an embodiment of the present invention.

FIG. 2 is a flow chart that schematically illustrates a method for diversity reception, carried out by diversity receiver 28 of FIG. 1, in accordance with an embodiment of the present invention. The method begins with reception channels 36A and 36B receiving a signal that carries 2-D encoded data, at a reception step 70. Each 2-D decoding unit decodes the first and second codes that encode the rows and columns of the data table produced by the corresponding reception channel, at an initial decoding step 74.

Diversity combining unit 44 constructs composite data table 64 from the individual data units of the rows and columns of data tables 60A and 60B produced by reception channels 36A and 36B, at a diversity combining step 78. In an example embodiment, unit 44 populates the composite data table with data units from rows and columns of tables 60A and 60B whose success indications indicate successful decoding.

Unit 44 reconstructs the transmitted data from the composite data table, at a reconstruction step 82. Typically, unit 44 decodes the first and second codes that encode the rows and columns of the composite data table, respectively, so as to reconstruct the data.

Although the embodiments described herein mainly address diversity reception of 2-D encoded data in MDTV receivers, the methods and systems described herein can also be used in other applications that involve 2-D encoding, such as in other kinds of wireless receivers, Digital Video Disks (DVDs), Hard Disk Drives (HDDs), memories and backplanes.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:

using at least first and second reception channels, receiving a signal that carries data comprising multiple data units, wherein the data units are encoded with first and second codes such that, when the data units are arranged in rows and columns, the rows are encoded with the first code and the columns are encoded with the second code;

selectively combining the data units received by the first and second reception channels to produce composite data, which includes at least one row or column that comprises a first data unit received from the first reception channel and at least a second data unit received from the second reception channel, based on row and column decoding success indications, including:

identifying a given data unit for which one of the first and second codes is not decodeable in any of the reception channels, but for which the other of the first and second codes is decodeable in at least one of the reception channels; and adding to the composite data the given data unit from a reception channel in which the other of the first and second codes is decodeable; and decoding the first and second codes for the composite data, including the at least one row or column, so as to reconstruct the data.

2. The method according to claim 1, wherein the data units comprise at least one data type selected from a group of types consisting of bits, bytes, words and symbols.

3. The method according to claim 1, wherein receiving the signal comprises decoding the first or second code for at least some of the rows or columns of the data received by the first and second reception channels, and wherein selectively combining the data units comprises identifying one or more rows or columns whose decoding is successful in at least one of the first and second reception channels, and adding one or more of the data units of the identified rows or columns to the composite data.

4. The method according to claim 1, wherein decoding the first and second codes comprises applying an iterative decoding process that alternates between decoding of the first code and decoding of the second code.

5. The method according to claim 1, wherein each of the first and second codes comprises one of an Error Correction Code (ECC) and an Error Detection Code (EDC).

6. The method according to claim 3, wherein selectively combining the data units comprises identifying at least one row or column whose decoding has failed in all the reception channels, and marking the data units of the identified row or column in the composite data as erasures, and wherein decoding the first and second codes comprises decoding at least one of the codes based on the erasures.

7. A communication apparatus, comprising:

at least first and second reception channels, each of which reception channels is configured to receive a signal that carries data comprising multiple data units, wherein the data units are encoded with first and second codes such that, when the data units are arranged in rows and columns, the rows are encoded with the first code and the columns are encoded with the second code; and circuitry, which is configured to selectively combine the data units received by the first and second reception channels to produce composite data, which includes one row or column that comprises a first data unit received from the first reception channel and at least a second data unit received from the second reception channel, based on row and column decoding success indications, including identifying a given data unit for which one of the first and second codes is not decodeable in any of the reception channels, but for which the other of the first and second codes is decodeable in at least one of the reception channels, and adding to the composite data the given data unit from a reception channel in which the other of the first and second codes is decodeable, and to decode the first and second codes for the composite data, including the at least one row or column, so as to reconstruct the data.

8. The apparatus according to claim 7, wherein the data units comprise at least one data type selected from a group of types consisting of bits, bytes, words and symbols.

9. The apparatus according to claim 7, wherein the circuitry is configured to decode the first or second code for at least some of the rows or columns of the data received by the first and second reception channels, to identify one or more rows or columns whose decoding is successful in at least one of the first and second reception channels, and to add one or more of the data units of the identified rows or columns to the composite data.

10. The apparatus according to claim 7, wherein the circuitry is configured to decode the first and second codes in an iterative decoding process that alternates between decoding of the first code and decoding of the second code.

11. The apparatus according to claim 7, wherein each of the first and second codes comprises one of an Error Correction Code (ECC) and an Error Detection Code (EDC).

12. The apparatus according to claim 9, wherein the circuitry is configured to identify at least one row or column whose decoding has failed in all the reception channels, to mark the data units of the identified row or column in the composite data as erasures, and to decode at least one of the codes based on the erasures.

* * * * *